United States Patent
Harrison et al.

(10) Patent No.: US 9,386,048 B2
(45) Date of Patent: Jul. 5, 2016

(54) METHOD OF MANAGING CONNECTIVITY BETWEEN RESOURCES IN A COMPUTER NETWORK AND SYSTEM THEREOF

(71) Applicant: Tufin Software Technologies Ltd., Ramat Gan (IL)

(72) Inventors: Reuven Harrison, Ramat Gan (IL); Michael Hamelin, Suwanee, GA (US)

(73) Assignee: Tufin Software Technologies Ltd., Ramat Gan (IL)

( * ) Notice: Subject to any disclaimer, the term of this patent is extended or adjusted under 35 U.S.C. 154(b) by 224 days.

(21) Appl. No.: 14/027,377

(22) Filed: Sep. 16, 2013

(65) Prior Publication Data

US 2014/0082196 A1    Mar. 20, 2014

Related U.S. Application Data

(60) Provisional application No. 61/705,018, filed on Sep. 24, 2012.

(30) Foreign Application Priority Data

Sep. 19, 2012   (IL) .......................................... 221975

(51) Int. Cl.
  *G06F 15/173*   (2006.01)
  *H04L 29/06*   (2006.01)
(52) U.S. Cl.
  CPC ........ *H04L 65/1069* (2013.01); *H04L 63/0227* (2013.01); *H04L 63/0263* (2013.01)
(58) Field of Classification Search
  CPC ... H04L 63/101; H04L 65/1069; H04L 63/20; H04L 63/0227; H04L 29/06; H04L 63/0263
  USPC .......... 709/223, 224, 225, 226, 227, 228, 229
  See application file for complete search history.

(56) References Cited

U.S. PATENT DOCUMENTS

| | | | | |
|---|---|---|---|---|
| 7,610,621 | B2 * | 10/2009 | Turley et al. | 726/11 |
| 8,255,466 | B2 | 8/2012 | Flack | |
| 8,621,552 | B1 * | 12/2013 | Lotem et al. | 726/1 |
| 2003/0212657 | A1 | 11/2003 | Kaluskar | |
| 2005/0005165 | A1 | 1/2005 | Morgan | |

(Continued)

*Primary Examiner* — Cheikh Ndiaye
(74) *Attorney, Agent, or Firm* — Wiggin and Dana LLP; Gregory S. Rosenblatt; Jonathan D. Hall

(57) ABSTRACT

There are provided a computer-implemented connectivity manager and a method of managing connectivity between resources in a computer network using the connectivity manager. The method comprises: generating a connectivity specification of a given application, said specification comprising one or more connections generated in accordance with received by the connectivity manager user's definition of network resources and connections therebetween required to the given application, each connection characterized by one or more source resources, one or more destination resources and services therebetween; recognizing, by the connectivity manager, all access-control devices among the plurality of access-control devices, which are involved in controlling all connections comprised in said connectivity specification; identifying, by the connectivity manager, in each of the recognized access-control devices, access-control rules engaged in control of connections comprised in said connectivity specification; and mapping, by the connectivity manager, said connections comprised in said connectivity specification to the identified engaged access-control rules.

22 Claims, 13 Drawing Sheets

(56) References Cited

U.S. PATENT DOCUMENTS

| | | | |
|---|---|---|---|
| 2006/0085839 A1* | 4/2006 | Brandt et al. | 726/2 |
| 2007/0016937 A1* | 1/2007 | Bassett et al. | 726/1 |
| 2007/0016945 A1* | 1/2007 | Bassett et al. | 726/11 |
| 2008/0159175 A1 | 7/2008 | Flack | |
| 2008/0282314 A1 | 11/2008 | Abzarian | |
| 2008/0301765 A1* | 12/2008 | Nicol et al. | 726/1 |
| 2009/0089431 A1 | 4/2009 | Kim | |
| 2010/0299741 A1 | 11/2010 | Harrison | |
| 2011/0060713 A1 | 3/2011 | Harrison | |
| 2011/0110268 A1* | 5/2011 | Panasyuk et al. | 370/254 |
| 2012/0192246 A1 | 7/2012 | Harrison | |

* cited by examiner

| SecureChange | | SecureApp | | |
|---|---|---|---|---|
| APPLICATIONS | | | | |
| Status | Name ▲ | Owner | Comment | Created |
| — | Accounting System | Dave | For finance dept. | Sat, 1 Sep 2012 |
| — | Ad Track | Alice | Tracks advertizing status for projects | Sat, 1 Sep 2012 |
| — | Applicant Tracking | Alice | Application management for HR d... | Sat, 1 Sep 2012 |
| ✚ | Billing App | Joe | Managing billing for manufacturin... | Tue, 28 Aug 2012 |
| — | Cashier | Alice | Tracks bids, plans and other docu... | Sat, 1 Sep 2012 |
| ✚ | Conferencing system | Alice | Used for booking conferencing me... | Sat, 1 Sep 2012 |
| ✚ | CRM | Sam | Manage relationships with our cust... | Sat, 25 Aug 2012 |
| — | DB1 | Lisa | Central user database (customer re... | Sat, 25 Aug 2012 |
| — | Developer Portal | Alice | All development resources online i... | Sat, 1 Sep 2012 |
| — | DNS | Joe | Domain name resolution | Sat, 1 Sep 2012 |
| — | Financial reporting | Sam | Generate monthly cashflow reports | Mon, 3 Sep 2012 |
| ✚ | New CRM | Sam | New CRM in the cloud (still in deve... | Tue, 4 Sep 2012 |
| — | Payroll Reports | Joe | Overtime payroll reports invoked fr... | Sat, 1 Sep 2012 |
| — | Project Tracker | Alice | Tracks all project reports and their l... | Sat, 1 Sep 2012 |
| — | Project X | Michael | Classified. | Sun, 2 Sep 2012 |
| — | Reporting Center Support | Alice | Provides information about incomi... | Sat, 1 Sep 2012 |
| — | Reservation system | Dave | Reserve flights and hotels for busin... | Sat, 1 Sep 2012 |
| — | Technical Support System | Dave | Support tickets and escalation stst... | Sat, 1 Sep 2012 |
| ✚ | Trading system | Sam | On-line trading for brokers and tra... | Sat, 1 Sep 2012 |
| — | Transaction processing system | Dave | Wire transaction status monitoring | Sat, 1 Sep 2012 |
| — | Vulnerability scanner | Joe | Scanning our network for security... | Sat, 1 Sep 2012 |

| SecureChange | SecureApp | | |
|---|---|---|---|
| APPLICATIONS → SAP | | | |
| ✱New Connection · Revert · ▭Save Connections | | Connectivity | History |
| Name | Source | Service | Destination |
| Connection to SAP ⌐71 | ▭Web Server (local) → | ▭HTTP_and_HTTPS... → | ▭SAP Server |
| | Created:9/8/2012; Last Modified:9/8/2012 | | |
| System administration ⌐72 | ▭Sys admins [Info] → | ▭http ▭ssh → | ▭Web Server(local) ▭SAP Server ▭SAP Server(legacy)⌐81 |
| ▭Ready to create ticket | Created:9/4/2012; Last Modified:9/8/2012 | | |
| User access ⌐73 | ▭US Sales [Info] → | ▭http → | ▭Web Server(local) |
| | Created:9/4/2012; Last Modified:9/8/2012 | | |
| Connection to cloud service ⌐74 | ▭SAP Server → | ▭https → | ▭Oracle DB |
| | Created:9/4/2012; Last Modified:9/8/2012 | | |

| | SecureChange | SecureApp | | |
|---|---|---|---|---|
| APPLICATIONS →SAP | | | Connectivity | History |
| ✱New Connection 🗑 Revert 🖫Save Connections | | | | |
| Name | Source | Service | Destination | |
| Connection to SAP ⌒71 ✎ | ▣Web Server (local) | → ♣HTTP_and_HTTPS_... | → ▣SAP Server | |
| | | Created:9/8/2012; Last Modified:9/8/2012 | | |
| ~~System administration~~ ⌒72 ✎ | ▣~~Sys admins~~ [Info] | → ♣~~http~~<br>♣~~ssh~~ | → ~~▣Web Server(local)~~<br>~~▣SAP Server~~ | |
| | | Created:9/4/2012; Last Modified:9/8/2012 | | |
| User access ⌒73 ✎ | ▣US Sales [Info] | → ♣http | → ▣Web Server(local) | |
| | | Created:9/4/2012; Last Modified:9/8/2012 | | |
| Connection to cloud service ⌒74 ✎ | ▣SAP Server | → ♣https | → ▣Oracle DB | |
| | | Created:9/4/2012; Last Modified:9/8/2012 | | |

Figure 10

| | SecureChange | SecureApp | | |
|---|---|---|---|---|
| APPLICATIONS →SAP | | | | |
| | | Connectivity | History | |
| ✱New Connection 🗑 Revert 📇Save Connections | | | | |
| Name | Source | Service | Destination | Comment |
| Connection to SAP | 🖥Web Server (local) | →🔗HTTP_and_HTTPS_... → | 🖥SAP Server | |
| | | | Edit Server ✕ | |
| System administration | 👥Sys admins [Info] | 🔗http → 🔗ssh | *Type: Host ▸ *Name: SAP Server ▸ *IP adress: 172.16.23.44 Comment: ↑ | 100 |
| User access | 👥US Sales [Info] | →🔗http → | ⓘ Create a ticket only after you change the IP address Save | Save and create Ticket | Cancel | |
| | Created:9/4/2012; Last Modified:9/8/2012 | | | |
| Connection to cloud service | 🖥SAP Server | →🔗https → | 🖥Oracle DB | |
| | Created:9/4/2012; Last Modified:9/8/2012 | | | |

Figure 11

| SecureChange | Tasks | My Requests | Reports | Workflows | Dashboard | SecureApp |

☐ ALL TICKETS

| | SLA | ⓘ | ID | Subject | Step | Duration | Assigned to | Requester |
|---|---|---|---|---|---|---|---|---|
| ☐ | N/A | ✓ | 45 | SAP #2 | Business Approval | 2 Days | Alice | Sam |
| ☐ | N/A | ✓ | 44 | SAP #1 | Designer | | | |
| ☐ | N/A | ✓ | 43 | Trading system#1 | Bu | | | |
| ☐ | N/A | ⊘ | 42 | CRM #4 — 111 | Tec | | | |
| ☐ | N/A | ⊘ | 41 | CRM #3 | Bu | | | |
| ☐ | N/A | ⊘ | 40 | Financial reporting #1 | Bu | | | |

42 # I CRM # 4 (CRM)

1 — 2 — ⓘ3

Step name: Technical Design

Required Accessⓘ

| Risk Analysis | Designer... | Advisor... |
|---|---|---|
| Target | Source | |
| SMC-Perimeter/Standsrd + | 192.168.1 + | |

⚙▸
RSK
DSR
ADV
VER
AR1

ⓘ The following changes are recomended for your access requests:

▾ SMC-Perimeter/Standard　　　　👁 View

AR1　(for SMC-Perimeter/Standard)　　　Fulfilled: 100%
    • Add new network object Host_192.168.180.9:192.168.180.9
    • Add new network object Host_10.16.5.1:10.16.5.1
    • Add new network object Host_10.16.5.3:10.16.5.3
    • Add new network object Host_10.16.5.6:10.16.5.6　—110
    • Add new rule before rule 24

[ Redesign ]　[ Implement All ]　[ Close ]

Design comment ⓘ

Figure 12

Application Access Portal

Search: [T]

APPLICATION ACCESS PORTAL
Select the application that you want access to:

| Application Name | Access Type | Access Type Description |
|---|---|---|
| CRM | User Access | Use this when you need end-user access to the CRM |
| Accounting System | Clients | |

*Selected application: [Accounting System]
*Access type: [Clients]
Enter the details of the host to give access from:
*My computer: [172.16.10.150] ⓘ
Comment: [                    ]

Figure 13

METHOD OF MANAGING CONNECTIVITY BETWEEN RESOURCES IN A COMPUTER NETWORK AND SYSTEM THEREOF

CROSS-REFERENCE TO RELATED APPLICATIONS

The present application claims benefit from Israeli Patent Application No. 221975 filed on Sep. 19, 2012 and US Provisional Patent Application No. 61/705,018 filed on Sep. 24, 2012; the entire contents of these applications are hereby incorporated by reference in their entirety.

FIELD OF THE INVENTION

This invention generally relates to the field of access control to computer network resources, and more particularly, to methods and systems capable of connectivity management.

BACKGROUND OF THE INVENTION

Today, access control is one of the critical concerns in computer networks and services. Various methods have been developed for control of access to various resources and services; usually these methods include implementation of one or more security or other access policies, combinations and hierarchies thereof. Typically, an access policy implemented in a respective rule-set includes control of inbound and outbound traffic related to certain resources. Such control is enforced with the help of one or more access-control gateways, which can comprise various devices and/or combinations thereof (e.g. switches, routers, firewalls, VPN devices, load balancers, web proxies, etc.).

However, managing connectivity requests in a framework of implemented access control rule-set(s) presents an increasing challenge to security departments worldwide. The problems of handling connectivity requests have been recognized in the Prior Art and various systems have been developed to provide a solution, as for example:

US Application No. 2012/192246 (Harrison) discloses a system capable of automated mapping between a connectivity request and an ordered security rule-set and a method of operating thereof. The system includes an interface operable to obtain data characterizing at least one connectivity request; a module for automated recognizing at least one rule within the rule-set, the rule controlling traffic requested in the at least one connectivity request, wherein the recognizing is provided by comparing a set of combinations specified in the connectivity request with a set of combinations specified in the rule and matching connectivity-related actions specified in the connectivity request; a module for automated evaluating relationship between traffic controlled by the recognized at least one rule and traffic requested in the at least one connectivity request; and a module for automated classifying, in accordance with evaluation results, the at least one connectivity request with respect to the at least one rule and/or vice versa.

US Patent Application No. 2008/282314 (Abzarian et al.) discloses a firewall helping a user make a decision regarding network access for an application executing on a computing device by providing "hints" to the user about an appropriate network access policy. If at least one previously set firewall policy for the application exists in a context different from a current context, the user may be presented with information based on a previously set firewall policy. The information may be prioritized based on a source of the previously set firewall policy and other factors, to provide the user with a hint that facilitates making the decision appropriate in the current context. A programming interface to the firewall allows third party applications to specify a format in which hints are provided to the user.

US Patent Application No. 2005/005165 (Morgan et al.) discloses a method for a firewall-aware application to communicate its expectations to a firewall without requiring the firewall to change its policy or compromise network security. An application API is provided for applications to inform a firewall or firewalls of the application's needs, and a firewall API is provided that informs the firewall or firewalls of the application's needs. An interception module watches for connect and listen attempts by applications and services to the network stack on the local computer. The interception module traps these attempts and determines what user is making the attempt, what application or service is making the attempt, and conducts a firewall policy look-up to determine whether the user and/or application or service are allowed to connect to the network. If so, the interception module may instruct the host and/or edge firewall to configure itself for the connection being requested.

US Patent Application No. 2003/212657 (Lu et al.) discloses an extensible rules engine that uses database technology that provides a rules evaluation service for applications external to the database server or database management system. Applications are able to utilize the rules engine to provide alternative behaviors based on information against which specified conditions are evaluated. A framework is provided for specifying data definitions that can be referenced by user-defined rules, through creation and use of an evaluation context. Application-specific data types can be defined by specifying data tables and/or variables that can be referenced by rules created for evaluation against data that is associated with the evaluation context.

SUMMARY OF THE INVENTION

Access policy serves the function of allowing business connectivity with minimized exposure. The respective rule-set(s), implemented on one or more access-control devices, usually require constant amendments corresponding to changes in business needs. Typically, the rule-sets are amended in response to connectivity requests. The requested connectivity between network resources (source and destination) can be characterized by accepting, denying, authenticating, encrypting or taking other actions related to the traffic between the specified network resources. Optionally, the connectivity request can specify also duration of the required connectivity. Some connectivity requests can become fully or partly satisfied only upon changes of the current rule-set.

All network applications require connectivity between associated network resources. Some applications require multiple connections and different types of connectivity in order to work. For example, a basic website can require connectivity from the Internet to a web server over HTTP and from the web server to a database server over specific ports. If any of the required connections is blocked by an access-control device, users cannot access the website. Typically, an application owner (referred to hereinafter also as a business owner) can handle a list of all of the connections between the application resources, but cannot create a detailed set of instructions for implementing the connectivity in the security gateways. On the other hand, the network and security teams can analyze the locations of each server to decide which security gateways need to have rules to allow the application connectivity, but they cannot easily manage all of the firewall rules to make sure they are all maintained in accordance with connectivity changes in the application by the application owner. Users are interested in specifying the connectivity requests by identifying the requested application, while administrators need to map such requests to rule-set(s) implemented on one or more access-control devices. By way of non-limiting example, a user (or an application running on the client side) may request access to a CRM application, while a security administrator needs to identify which rules among hundreds (or even thousands) of rules on tens of firewalls are associated with the CRM.

In accordance with certain aspects of the presently disclosed subject matter, there is provided a technique for automated managing connectivity and monitoring network resources and connections therebetween associated with a given application.

In accordance with other aspects of the presently disclosed subject matter, there is provided a method of managing connectivity between resources in a computer network comprising a plurality of access-control devices controlling connectivity between the network resources. The method comprises: generating, by a connectivity manager, a connectivity specification of a given application, said specification comprising all connections generated in accordance with received by the connectivity manager user's definition of network resources and connections therebetween required to the given application, each connection characterized by one or more source resources, one or more destination resources and services therebetween; recognizing, by the connectivity manager, all access-control devices among the plurality of access-control devices, which are involved in controlling all connections comprised in said connectivity specification; identifying, by the connectivity manager, in each of the recognized access-control devices, access-control rules engaged in control of connections comprised in said connectivity specification; and mapping, by the connectivity manager, said connections comprised in said connectivity specification to the identified engaged access-control rules.

The connectivity specification of the given application can be obtained by generating the specification in accordance with a user's definition and/or by amending a generated connectivity specification of the given application.

In accordance with further aspects of the presently disclosed subject matter, recognizing the access-control devices involved in controlling all connections comprised in connectivity specification can be provided responsive to an event selected from a group comprising: generating the connectivity specification; amending a generated connectivity specification of the given application; receiving client's connectivity request addressed to the given application.

In accordance with further aspects of the presently disclosed subject matter, the method can further comprise monitoring changes related to access-control devices and/or changes related to access-control rules implemented on the access-control devices (e.g. new security gateways, configuration changes in the existing security gateways, changes in the implemented rule-set(s), changes in access-control policies implemented on systems capable of managing the access control devices, changes in databases accommodating information related to the access-control policies, etc.), and further re-identifying the engaged rules responsive to respective changes.

In accordance with further aspects of the presently disclosed subject matter, the results of mapping can be indicative of changes to be made in the engaged access-control rules in order to fit the connections comprised in the connectivity specification and/or a client's connectivity request addressed to the given application. The method can further comprise issuing one or more tickets related to the access-control devices and specifying the changes. Alternatively or additionally, the method can further comprise automated amending implemented access-control rules in accordance with the results of the mapping.

In accordance with further aspects of the presently disclosed subject matter, the method can further comprise evaluating a connectivity status of at least one connection in the given application and/or evaluating a connectivity status of the given application in accordance with the results of the mapping. Alternatively or additionally, the method can further comprise evaluating the client's connectivity request addressed to the given application in accordance with the results of the mapping.

The method can further comprise monitoring the connectivity status of the given application, recognizing the status changes, and issuing a respective alert.

In accordance with further aspects of the presently disclosed subject matter, the method can further comprise presenting the recognized access-control devices and/or the identified engaged access-control rules for connections specified in the application.

The method can further comprise accommodating the connectivity specification of the given application in a memory of the connectivity manager. The method can further comprise accommodating in the memory of the connectivity manager the results of the mapping and/or the recognized access-control devices and/or the identified engaged access-control rules for each connection comprised in the connectivity specification, the accommodation provided in association with the accommodated connectivity specification of the given application.

In accordance with other aspects of the presently disclosed subject matter, there is provided a computer-implemented connectivity manager capable of automated managing connectivity between resources in a computer network comprising a plurality of access-control devices controlling connectivity between the network resources. The manager comprising a computer-implemented connectivity engine operatively coupled to a computer-implemented network interface, wherein the connectivity engine, implemented on a processor, is configured to: obtain a connectivity specification of a given application, said specification comprising one or more connections generated in accordance with a user's definition of resources and connections therebetween required to the given application, each connection characterized by one or more source resources, one or more destination resources and services therebetween; recognize, using the network interface, all access-control devices, among the plurality of access-control devices, involved in controlling connections comprised in said connectivity specification; identify in each of the recognized access-control devices, access-control rules engaged in control of connections comprised in said connectivity specification; and map said connections comprised in said connectivity specification to the identified engaged access-control rules.

The connectivity engine can be configured to recognize the access-control devices involved in controlling all connections comprised in said connectivity specification responsive to an event selected from a group comprising: generating the connectivity specification; amending a generated connectivity specification of the given application; receiving client's connectivity request addressed to the given application.

In accordance with further aspects of the presently disclosed subject matter, the connectivity manager can further comprise a client interface configured to receive a user's definition of connections, wherein the connectivity engine can be configured to generate the connectivity specification of the given application in accordance with a received user's definition. Alternatively or additionally, the client interface can be configured to receive one or more user's amendments of the connectivity specification, wherein the connectivity engine can be configured to generate the connectivity specification of the given application in accordance with received amendments.

In accordance with further aspects of the presently disclosed subject matter, the connectivity engine can be further configured to monitor changes related to access-control devices and/or changes related to access-control rules implemented on the access-control devices and to re-identify the engaged rules responsive to the discovered changes.

In accordance with further aspects of the presently disclosed subject matter, the connectivity engine can be further configured to issue one or more tickets related to the access-control devices and specifying the changes or to automatically amend implemented access-control rules in accordance with the results of the mapping.

In accordance with further aspects of the presently disclosed subject matter, the connectivity engine can be further configured to evaluate, in accordance with the results of the mapping, a connectivity status of at least one connection in the given application, and/or a connectivity status of the given application and/or the client's connectivity request addressed to the given application.

In accordance with further aspects of the presently disclosed subject matter, the connectivity engine can be further configured to monitor the connectivity status of the given application, to recognize the status changes, and to issue a respective alert.

In accordance with further aspects of the presently disclosed subject matter, the connectivity engine can be further configured to present the recognized access-control devices and/or the identified engaged access-control rules for connections specified in the application.

BRIEF DESCRIPTION OF THE DRAWINGS

In order to understand the invention and to see how it can be carried out in practice, an embodiment will now be described, by way of non-limiting example only, with reference to the accompanying drawings, in which:

FIGS. 5-13 illustrate exemplified fragments of screenshots illustrating some details of the generalized flow-chart illustrated with reference to FIGS. 3-4.

DETAILED DESCRIPTION OF EXEMPLARY EMBODIMENTS

Figure 1:
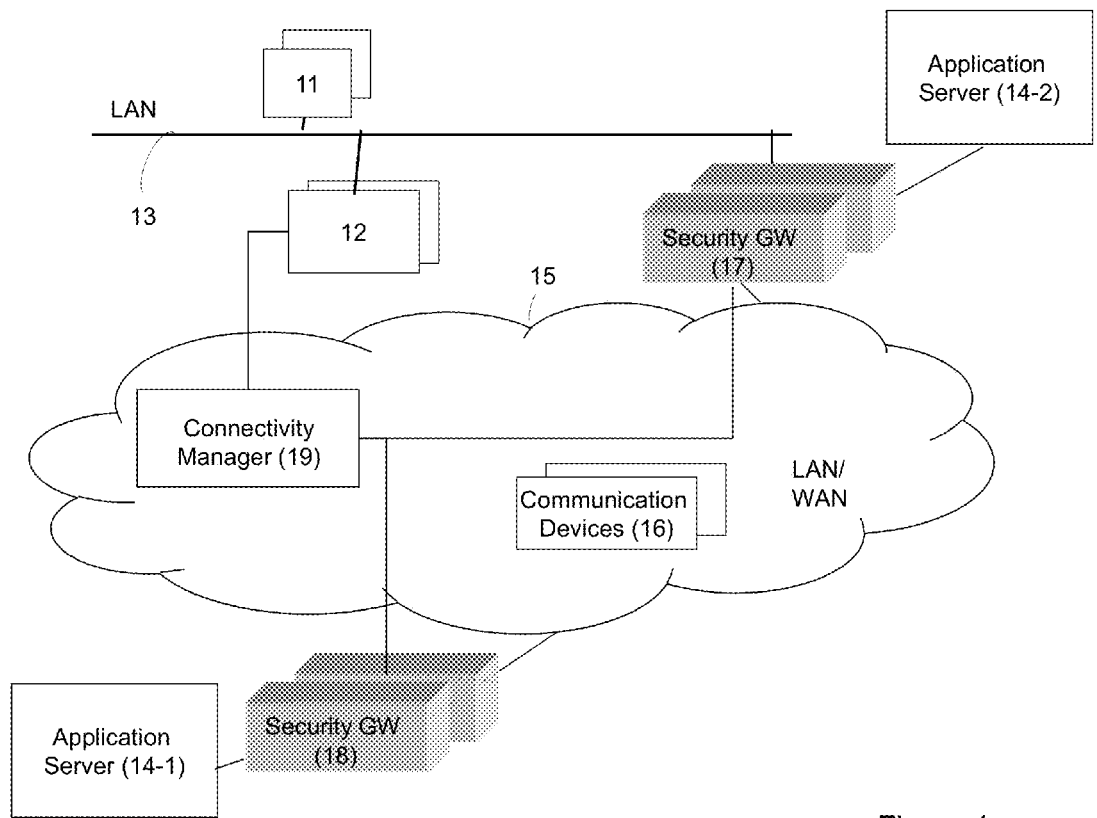
FIG. 1 illustrates a generalized network architecture in accordance with certain embodiments of the presently disclosed subject matter.

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "recognizing", "identifying", "generating", "mapping" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including the connectivity manager disclosed herein.

The operations in accordance with the teachings herein can be performed by a computer specially constructed for the desired purposes or by a general-purpose computer specially configured for the desired purpose by a computer program stored in a non-transitory computer readable storage medium.

Embodiments of the presently disclosed subject matter are not described with reference to any particular programming language. It will be appreciated that a variety of programming languages can be used to implement the teachings of the inventions as described herein.

The references cited in the background teach many principles of security management that are applicable to the present invention. Therefore the full contents of these publications are incorporated by reference herein where appropriate for appropriate teachings of additional or alternative details, features and/or technical background.

Bearing the above in mind, attention is drawn to FIG. 1 schematically illustrating a generalized network architecture in accordance with certain embodiments of the presently disclosed subject matter.

The network environment comprises a plurality of network resources, e.g. workstations 11 and/or servers 12, application servers 14-1 and 14-2 (and/or others not shown remote network resources as, for example, remote hosts, etc.). The network resources can be operatively connected via one or more local (13) and/or wide area (15) communication networks (including Internet). A communication network comprises one or more communication devices 16 (e.g. switches, routers, bridges, etc.) facilitating the data transfer. The network environment further comprises one or more access-control devices. In the illustrated non-limiting example, the access-control device 17 is a security gateway operatively connected to the private network 13 and to the wide area network 15 and controlling inbound and outbound traffic related to the private network and resources thereof. Access-control device 18 is a load balancer operatively connected to the application server 14-1 and to the wide area network 15 and distributing workload to the application servers by controlling access thereto.

In the illustrated exemplified network, an application 14 running on the application servers 14-1 and 14-2 is distributed over the network resources, and both illustrated access-control devices 17 and 18 are involved in controlling connections related to the application.

An access-control device can comprise, for example, one or more routers, firewalls or other security gateways, load balancers, web proxies, intrusion detection/prevention systems, VPN devices and/or other equipment facilitating network and/or application access control. Optionally, access-control devices can be integrated with communication devices or with protected resources (e.g. application servers).

For purpose of illustration only, the following description is made with respect to security gateways configured to control access in accordance with implemented security rules. Those skilled in the art will readily appreciate that the teachings of the presently disclosed subject matter are applicable in a similar manner to other devices capable of network and/or application access control in accordance with implemented access policy and rules.

The security gateways operate in accordance with one or more rules controlling, at least, inbound and/or outbound traffic with regard to respective resources. These rules (including combinations and/or hierarchies thereof) are referred to hereinafter as a rule-set or rule base. A single rule typically includes several fields (e.g. source (IP address and/or port), destination (IP address and/or port), service type, user, application, etc.), and an action which shall be drawn from the rule when a certain condition with regard to the field values is satisfied. The fields included in such condition(s) are referred to hereinafter as "fields engaged in the rules". A field can be characterized by a specified set of values (e.g. a certain IP address, a certain range of TCP ports, a certain range of IP addresses in a LAN defined by a mask, any port, etc.). The action in the rule can specify accepting or denying the respective traffic, authentication, encryption, etc.

In accordance with certain embodiments of the currently presented subject matter, the security gateways are operatively connected to a connectivity manager 19. As will be further detailed with reference to FIGS. 2-11, the connectivity manager 19 is operable to manage and monitor the connections between network resources corresponding to one or more applications. The connectivity manager can be further configured to handle connectivity requests addressed to one or more applications.

Note that the disclosed subject matter is not bound by the specific network architecture described with reference to FIG. 1, and is, likewise, applicable to any network architecture facilitating protection of data network resources in accordance with a rule-set installed at any suitable security gateway(s) capable of controlling the respective traffic.

Figure 2:
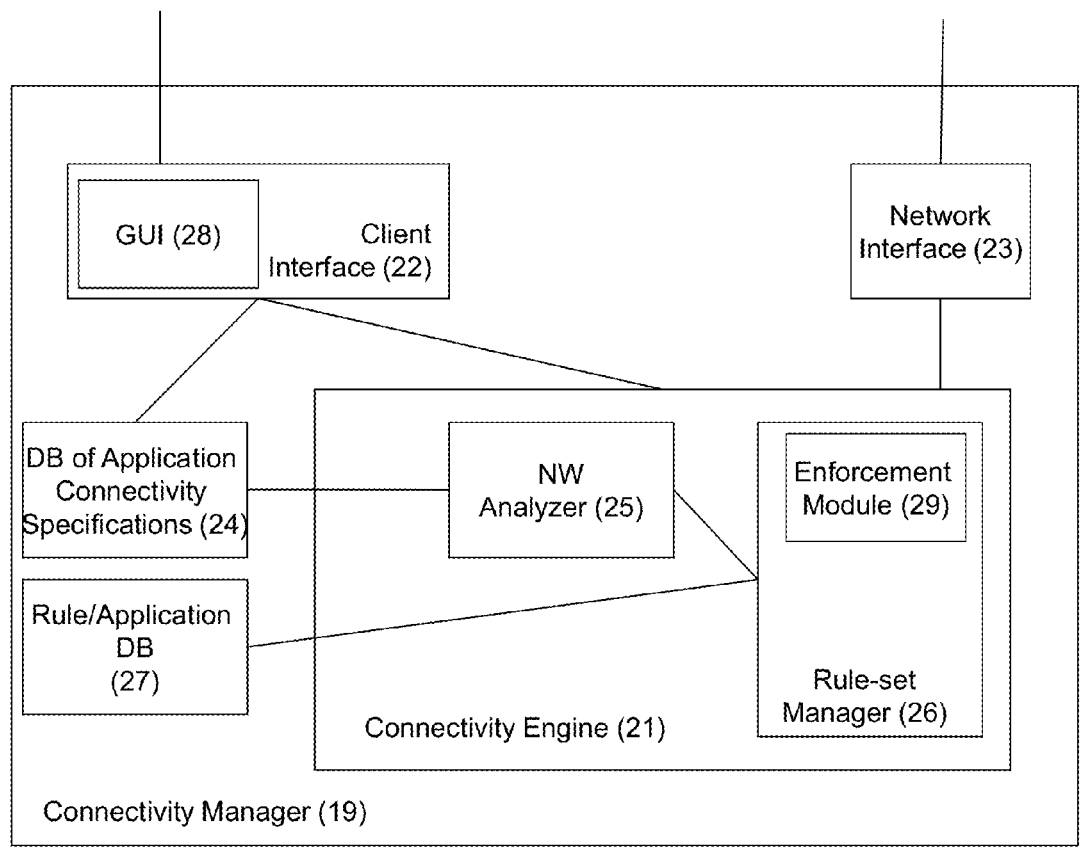
FIG. 2 illustrates a generalized functional diagram of a connectivity manager in accordance with certain embodiments of the presently disclosed subject matter.

FIG. 2 illustrates a generalized functional diagram of the connectivity manager 19 in accordance with certain embodiments of the currently presented subject matter. The connectivity manager 19 comprises a connectivity engine 21 operatively connected to a client interface 22 and a network interface 23. The computer-implemented client interface 22 is configured to obtain data characterizing a connectivity request initiated by a client (human user and/or application), such a connectivity request indicating an application to be accessed and referred to hereinafter as an application connectivity request. The client interface further comprises a graphical user interface (GUI) 28 configured to enable a user to specify and/or update network resources and connections thereof characterizing a given application.

For purpose of illustration only, the following description is made with respect to connections allowing certain traffic. Those skilled in the art will readily appreciate that the teachings of the presently disclosed subject matter are applicable in a similar manner to connections and connectivity requests alternatively or additionally related to dropping of certain traffic and/or other actions related to the specified traffic.

The computer-implemented network interface 23 is configured to enable communication with one or more security gateways and/or respective security gateways' management system(s) managing and/or accommodating respective security policies. This communication can be used, for example, for obtaining from the gateways information related to the implemented security rules and/or for enforcing changes in the implemented security rules. Such enforcing can be provided by sending tickets requesting some changes of the security rules or by direct amending of the implemented rules. The network interface 23 can be further configured to enable monitoring the security network changes, including recognizing new security gateways, configuration changes in the existing security gateways and/or changes in the implemented rule-set(s).

The connectivity engine 21 can be implemented on a processor configured to enable managing and monitoring the connections between network resources associated with certain applications. The connectivity engine is further operable to enable automated mapping between one or more application connectivity requests and security rules implemented on the security gateway(s) as well as to provide evaluation of the respective requests.

As will be further detailed with reference to FIGS. 3-11, the connectivity manager 19 further comprises a database 24 of one or more application connectivity specifications, each characterizing connectivity between network resources (e.g. users, servers, groups thereof, etc.) associated with the respective application. The specifications database 24 is operatively connected to the connectivity engine 21 and to the client interface 22.

A non-limiting example of user's definition of a CRM application is illustrated in Table 1. The defined servers can be characterized by one or more network addresses. The defined users can be characterized by respective network addresses or by data indicative of users' authentication (e.g. LDAP related data). The generated by the connectivity manager specification of the CRM application comprises all connections corresponding to the user's definition. Information required for generating the application connectivity specification based on a user's definition may be predefined in the connectivity manager and/or obtained by the connectivity manager by analyzing a network topology. Optionally, the information can be also provided, at least partly, by a user when defining the application connectivity.

TABLE 1

| # | Source | Destination | Protocol |
|---|--------|-------------|----------|
| 1 | CRM Users | CRM Web Server | https |
| 2 | CRM Web Server | CRM Application Servers | https |
| 3 | CRM Application Servers | Oracle Database | SQL |
| 4 | CRM Administrators | CRM Web Server<br>CRM Application Servers | SSH |
| 5 | System monitoring | CRM Web Server<br>CRM Application Servers | icmp<br>http |

As will be further detailed with reference to FIGS. 3-11 the specifications DB 24 can be maintained via the GUI 28. Optionally, GUI 28 can be further configured to enable a user to specify access requests to given applications.

The connectivity engine 21 further comprises a network analyzer 25 capable of recognizing security gateways involved in controlling the connectivity between network resources associated with a given certain application and/or security gateways relevant for a given application connectivity request. The network analyzer is further capable of monitoring the security network, including recognizing new security gateways, configuration changes in the existing security gateways and/or changes in the implemented rule-set(s). The network analyzer can recognize the respective security gateways by analyzing a network topology. The network topology analyses can include, for example, analyzing one or more of the following models related to network security:
- an IP (ipv4 or ipv6) routing model;
- a network address translation (NAT) model;
- a security policy model;
- a load balancing model;
- a web proxy model;
- a VPN model;
- a user permission model, etc.

The network analyzer can receive all or part of the models from a 3$^{rd}$ party via the network interface and/or can generate all or part of the models by itself using network-related data obtained via the network interface.

The connectivity engine further comprises a rule-set manager 26 operable to provide mapping between the application-associated connections and/or application connectivity request and to identify the relevant rules. Optionally, data indicative of the rules corresponding to a given application can be accommodated in the rules/application database 27 operatively connected to the connectivity engine 21. The database 27 can be updated in accordance with changes in application specifications and/or security gateways and/or respective implemented rule-sets. By way of non-limiting example, the rule-set manager can operate in a manner detailed in US Application No. 2012/192246, assigned to the assignee of the present invention and incorporated herein by reference in its entirety. The rule-set manager 26 is further configured to evaluate application connectivity specification, changes thereof and/or application connectivity requests in accordance with the mapping results.

The rule-set manager can further comprise an enforcement module 29 configured to issue tickets to respective security gateway(s) requiring to change respective rule-set(s) to provide the requested connections. Optionally, the enforcement module can be configured to assure, before issuing tickets, an absence of conflict (including resolving conflicts if necessary) between the required changes and the previously provided changes accommodated in the database 27.

Alternatively or additionally, the enforcement module can be configured to use the mapping results for generating one or more amendments of the implemented rule-set, said amendment capable to facilitate, if required, allowance of the application connectivity request and/or changes of application connectivity specification; and to enable automated implementing the generated amendment at one or more relevant security gateways. By way of non-limiting example, the enforcement module can use the techniques detailed in US Applications No. 2010/0299741 and No. 2011/060713, assigned to the assignee of the present invention and incorporated herein by reference in their entirety.

The presently disclosed subject matter is not bound by the specific architecture illustrated with reference to FIG. 2, equivalent and/or modified functionality can be consolidated or divided in another manner and can be implemented in any appropriate combination of software, firmware and hardware. The connectivity manager and/or parts thereof can be implemented as suitably programmed computer(s).

Those versed in the art will readily appreciate that the connectivity manager can be fully or partly integrated with the security gateway(s) and/or with other access control devices or can be implemented as a stand-alone entity connected to the access-control device(s).

Figure 3:
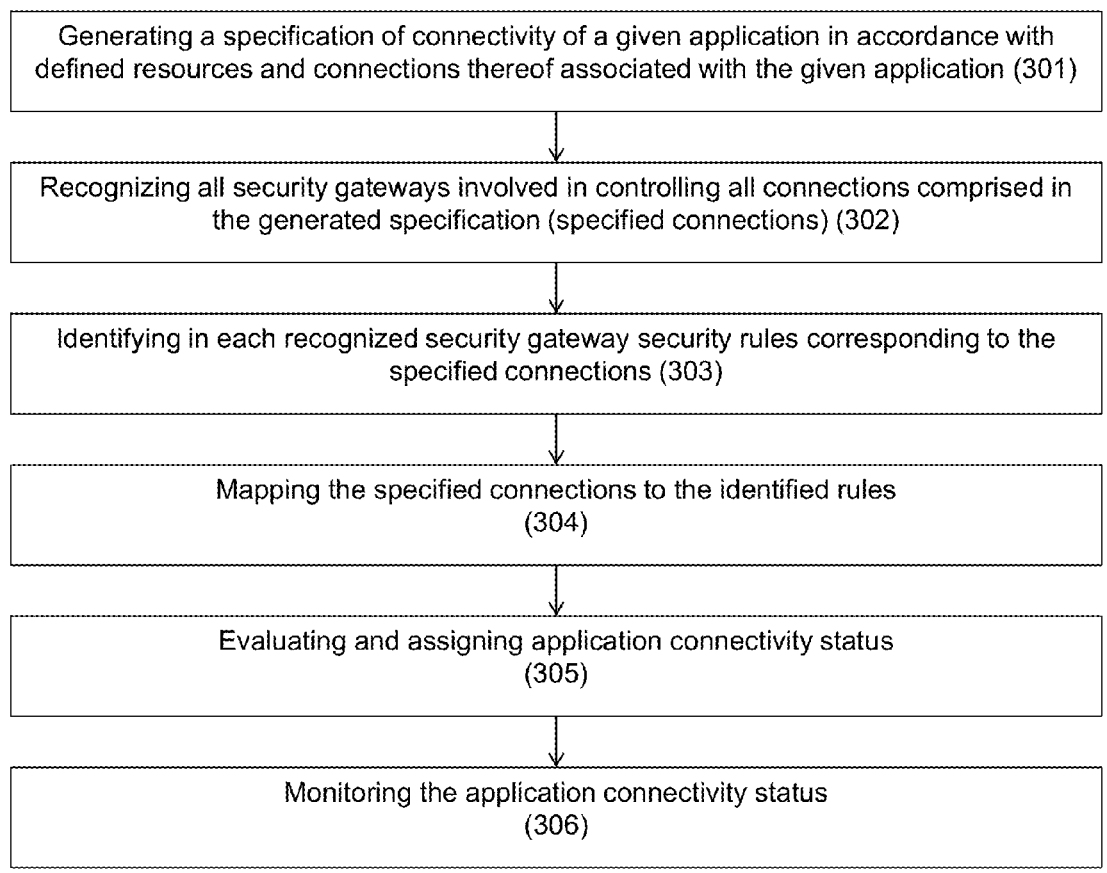
FIG. 3 illustrates a generalized flow-chart of managing network resources and connections therebetween associated with a given application in accordance with certain embodiments of the presently disclosed subject matter.

Referring to FIG. 3, there is illustrated a generalized flowchart of managing network resources and connections therebetween associated with a given application in accordance with certain embodiments of the presently disclosed subject matter. The connectivity manager generates (301) a specification of a connectivity of a given application in accordance with user's definition of resources and connections therebetween related to the given application and accommodates the generated application specification in the specifications database 24.

Figure 5:
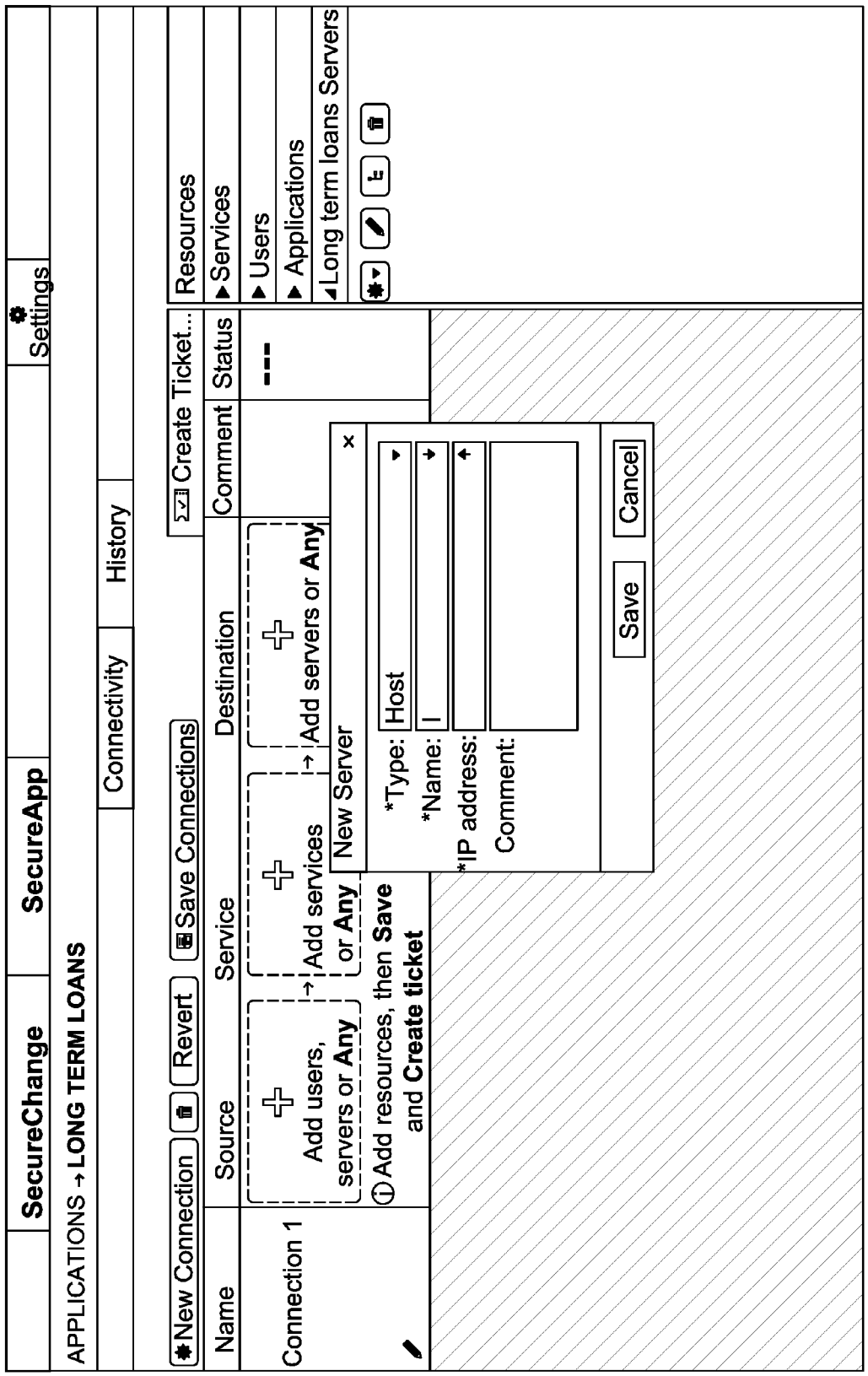

A non-limiting example of a fragment of a screenshot illustrating GUI configured for enabling a user to define a new application's connectivity is illustrated in FIG. 5. An application owner defines a new application's name, defines the resources (servers and users) associated with the application, and defines required connections (at least source, destination and protocol) between the resources. The connectivity manager generates the specification of connectivity of the new application in accordance with the provided definition. The same resources (e.g. servers, user groups) can be associated with different applications.

By way of non-limiting example, a server can represent host, IP range, subnet or server group. Servers can be selected, added and/or changed as source and/or destination of a given connection.

Users also can be selected, added and/or changed as source and/or destination of a given connection. A user or user group can be selected from a list of users or defined as a new user/group. A new user can be associated with a specific IP address and/or a user account in an LDAP server or other authentication servers. A user group can include users defined by IP addresses and/or LDAP users.

A service can be selected from a list of predefined services or can be defined as a new service. A service can be characterized by name, protocol, the application type (as used by next-generation firewalls), port number, timeout value in seconds (optional) and description of the service. Alternatively or additionally, an application can be defined with the help of application templates. The template includes one or more connections specified by names of source, destination and respective service therebetween (e.g. Web Server→HTTP→App Server), while the resources (Web Server and App Server in the previous example) do not need to be defined, they can be just placeholders. A user can instantiate the template into an application connectivity definition by adding the missing details (e.g. Web Server: 192.168.1.2→HTTP→App Server: 172.16.2.4).

Upon generation, the application connectivity specification is included in the specification list illustrated in the exemplified screenshot fragment in FIG. 6.

The generated application connectivity specification includes definition of each connection between resources related to the application. As illustrated by way of non-limiting example in FIG. 7, the exemplified connectivity specification of SAP application comprises connection 71 from the web server to the SAP server; connection 72 for system_administration user group to the web server and the SAP server; connection 73 for US_sales user group to the web server; and connection 74 from SAP server to Oracle server and DB1 servers owned by other applications. The application connectivity specification can be edited responsive to adding or removing resources specified in given connections; adding or deleting connections related to the specified application; and/or amending resource definitions in given connections (e.g. amending user group definition in LDAP). The required changes can be implemented by issuing tickets for implementing the changes or by direct amendment of respective access-control devices. It is to be noted that when generating a connection to a server owned by another application (as illustrated in connection 74), the connectivity manager automatically updates the connectivity specifications of the respective other application. Such generation can be also provided as conditional and requiring approval by the other owner of the respective other application.

As illustrated in FIG. 8, the destination in connection 72 has been amended to delete legacy SAP server 81. As illustrated in FIG. 9, the entire connection 72 has been deleted from the application connectivity specification. FIG. 10 illustrates an interface 100 for amending an IP address of the SAP server.

Referring back to FIG. 3, the connectivity manager further recognizes (302) all security gateways involved in controlling the connections comprised in the application connectivity specification, and identifies (303), in each of the recognized security gateways, security rules corresponding to the generated specification and engaged in control of respective connections. The connectivity manager further maps (304) the specified connections to the identified engaged security rules. Optionally, the connectivity manager issues a ticket to the respective security gateway(s) requiring to change respective rule-set(s) (amend, add and/or delete certain one or more rules) to provide the requested connections, or directly implement the required changes. FIG. 11 illustrates a non-limiting example of changes 110 specified in an exemplified ticket 111.

Before or upon providing the required rule-set(s) changes, the connectivity manager evaluates (305) a connectivity status of the given application in accordance with results of the mapping and assigns the status to the application and, optionally, to each of its specified connections. By way of non-limiting example, the required mapping and evaluation of results can be provided with the help of the technique disclosed in US Patent Application No. 2012/192246, assigned to the assignee of the present invention and incorporated herein by reference in its entirety.

The connectivity status of a given application can be characterized by a relationship between traffic corresponding to the application connectivity specification and the traffic controlled by the identified engaged rules. The status can be assigned in accordance with an implementation criterion characterizing whether the engaged rule(s) satisfy the specified connectivity in a full or partial manner. The status can be further assigned in accordance with a level of vulnerability which can be caused by amending the rules to satisfy the unsatisfied requested connectivity.

The connectivity manager further monitors changes related to the security gateways and/or changes related to security rules implemented on the security gateways, (including discovering new security gateways, configuration changes in the existing security gateways, changes in the implemented rule-set(s), changes in security policies and management thereof, changes in databases accommodating information related to the policies, etc.). The connectivity manager further re-identifies the engaged rules responsive to the discovered changes.

The connectivity manager further monitors (306) the application connectivity status and recognizes the status changes caused, for example, by changes in rule-set, routing, group definitions etc.

The application connectivity status can be also changed resulting in amendment of the application connectivity specification. Data indicative of an application's connectivity status and changes thereto can be accommodated in the rules/applications database 27. The changes in application connectivity status can be alerted to a security administrator or application owner. The application connectivity status and/or changes thereto can be presented to a user via GUI 28.

Optionally, the connectivity manager can further present to a user the recognized security gateways and/or identified engaged security rules for each connection specified in the application.

Figure 4:
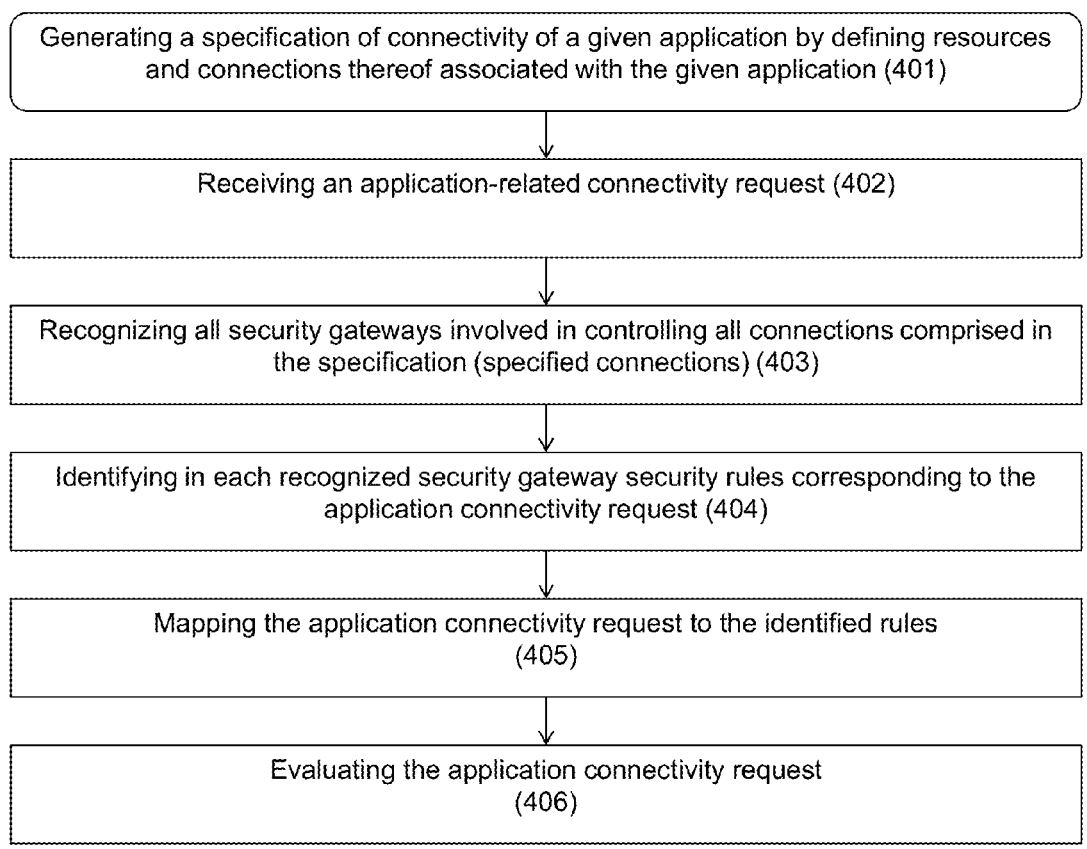
FIG. 4 illustrates a generalized flow-chart of evaluating an application-related connectivity request in accordance with certain embodiments of the presently disclosed subject matter.

Referring to FIG. 4, there is illustrated a generalized flowchart of evaluating a certain application-related connectivity request in accordance with embodiments of the presently disclosed subject matter. The application connectivity specifications generated (401) in accordance with user's definition of resources and connections therebetween are accommodated in the specification database 24. Upon receiving (402) an application-related connectivity request, the connectivity manager identifies the respective application among the applications in the database 24, recognizes (403) all security gateways involved in controlling the requested connections and identifies (404) in each of the recognized security gateways engaged security rules corresponding to the requested connection. The application-related connectivity request can be an application connectivity request (i.e. a request from a client for access to a given application) as well as a ticket generated by the connectivity manager in accordance with the changes in the application connectivity specification required by a user.

Optionally, previously recognized security gateways involved in controlling a given application can be stored in the database 24 in association with the respective application specification. This information can be updated by the connection manager periodically or responsive to a predefined event. Recognizing (403) the involved security gateways can comprise obtaining respective data from the database 24.

The connectivity manager further maps (405) the application-related connectivity request to the identified security rules and evaluates (406) the request. By way of non-limiting example, the required mapping and evaluation of results can be provided with the help of the technique disclosed in US Patent Application No. 2012/192246.

The results of the request's evaluation can be characterized by a relationship between traffic corresponding to the application-related connectivity request and the traffic controlled by the identified engaged rules. The request can be further classified in accordance with an implementation criterion characterizing whether the engaged rule(s) satisfy the connectivity request in a full or partial manner. The classification can be further indicative of a level of vulnerability that can be caused by amending the rules to satisfy the unsatisfied requested connectivity.

The connectivity manager can further monitor changes in application connectivity status caused by satisfying the application-related connectivity request.

Upon classification, the request can be allowed by an administrator or automatically, in accordance with predefined criteria. The user can be also informed about vulnerabilities of satisfying the request and/or reasons of disallowance.

Optionally, prior to recognizing security gateways (or other access-control devices) related to the connectivity request, the connectivity manager can map an application connectivity request to the application connectivity specification and recognize the type of required changes and/or a group of access-control devices corresponding to the request. For example, if a user requests access to a CRM application, the connectivity manager can map the request to a CRM connectivity specification and define that in order to provide the requested access, the user should be added to the respective user group. Accordingly, in case of an LDAP defined user group, the connectivity manager can require respective changes in the LDAP device.

Figure 12:
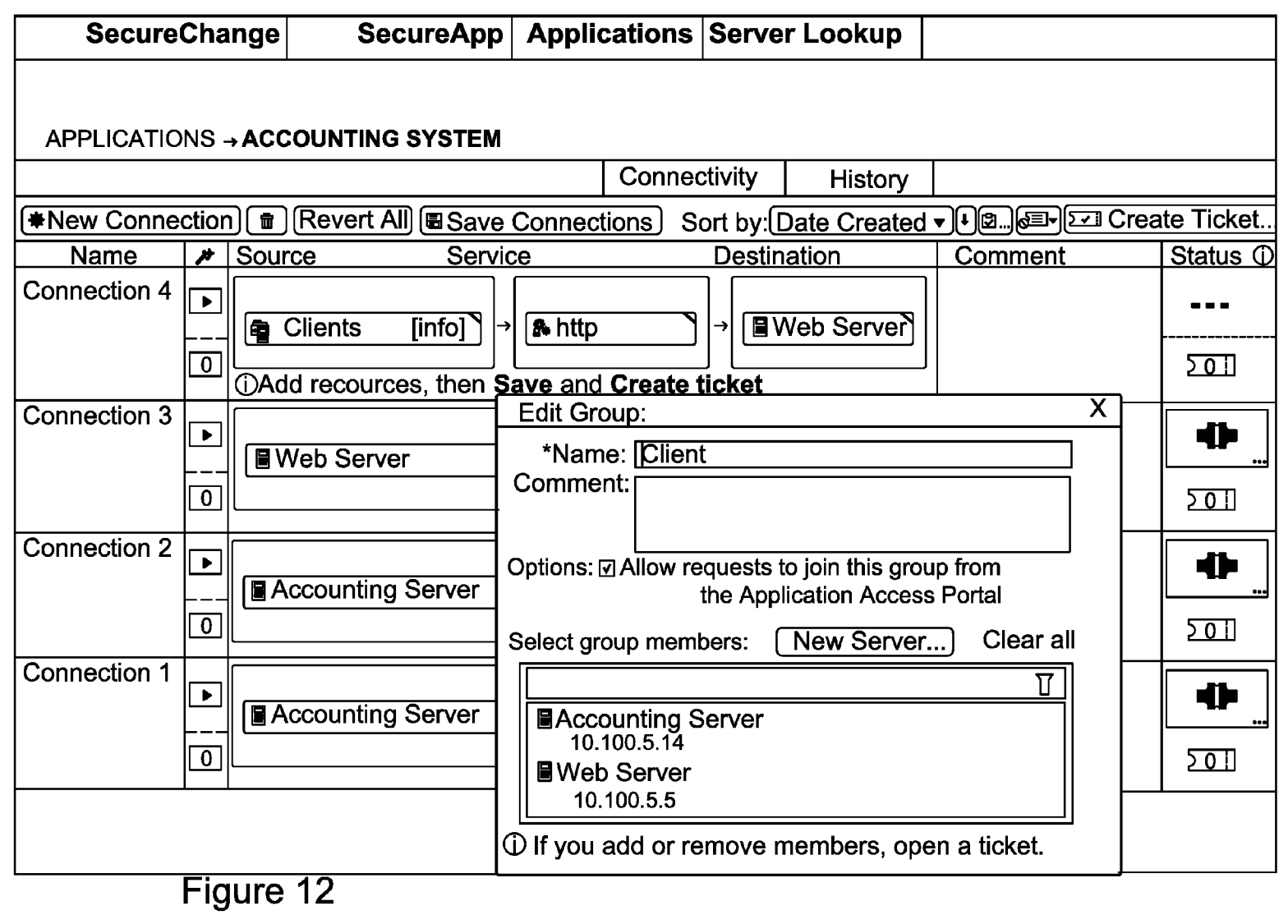

By way of non-limiting example, the results of mapping can be indicative of changes to be made in the engaged access-control rules in order to fit a client's connectivity request addressed to the given application. FIG. 12 illustrates a non-limiting example of defining an access group (Clients) to be available for client access requests (note that the group may appear in one or more connections as source or destination). FIG. 13 illustrates a non-limiting example of an application access portal enabling a client to request adding himself (e.g. by IP) to the group, or some other host or server. The connectivity manager can be configured to automatically map such request to the application connections and then to the relevant surety gateways and rules.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present invention.

It will also be understood that the system according to the invention can be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of managing connectivity between resources in a computer network comprising a plurality of access-control devices controlling a connectivity between the network resources in accordance with a plurality of access-control rules, the method comprising:
   a. generating, by a connectivity manager, a connectivity specification of a given application, said specification comprising all connections corresponding to received by the connectivity manager definition of a connectivity specified by a user with respect to the given application, each connection characterized by one or more source resources, one or more destination resources and services therebetween;
   b. recognizing, by the connectivity manager, all access-control devices among the plurality of access-control devices which are involved in controlling all connections comprised in said generated connectivity specification, wherein at least one access-control device is involved in controlling at least one connection which is not comprised in said generated connectivity specification;
   c. identifying, by the connectivity manager, in each of the recognized access-control devices, all access-control rules which are engaged in control of connections comprised in said connectivity specification, wherein the plurality of access-control rules comprises at least one rule which is not engaged in control of connections comprised in said connectivity specification;
   d. mapping, by the connectivity manager, said connections comprised in said connectivity specification to the identified engaged access-control rules, wherein the results of said mapping are indicative of changes to be made in the engaged access-control rules in order to provide the connections comprised in the connectivity specification and/or in a client's connectivity request addressed to the given application; and
   providing, in response to said mapping, at least one of the following:
   automatically amending the engaged access-control rules in accordance with said results of said mapping;
   issuing, by the connectivity manager, one or more tickets related to the access-control devices and specifying said changes;
   evaluating, by the connectivity manager, a connectivity status of at least one connection in the given application in accordance with said results of said mapping;
   evaluating, by the connectivity manager, a connectivity status of the given application in accordance with said results of said mapping.

2. The method of claim 1 further comprising amending, by the connectivity manager, the generated connectivity specification of the given application.

3. The method of claim 1 wherein recognizing said access-control devices involved in controlling all connections comprised in said connectivity specification is provided responsive to an event selected from a group comprising: generating said connectivity specification; amending a generated connectivity specification of the given application; and receiving a client's connectivity request addressed to the given application.

4. The method of claim 1 further comprising monitoring changes related to access-control devices and/or changes related to access-control rules implemented on the access-control devices and further re-identifying the engaged rules responsive to respective changes.

5. The method of claim 1 further comprising monitoring, by the connectivity manager, the connectivity status of the given application, recognizing the status changes, and issuing a respective alert.

6. The method of claim 1 further comprising evaluating, by the connectivity manager, the client's connectivity request addressed to the given application in accordance with said results of said mapping.

7. The method of claim 1 further comprising presenting the recognized access-control devices and/or the identified engaged access-control rules for connections specified in the application.

8. The method of claim 1 further comprising accommodating said connectivity specification of the given application in a memory of said connectivity manager.

9. The method of claim 1 further comprising accommodating the results of said mapping in the memory of said connectivity manager, said accommodation provided in association with accommodated connectivity specification of the given application.

10. The method of claim 1 further comprising accommodating the recognized access-control devices and/or the identified engaged access-control rules for each connection comprised in the connectivity specification, in the memory of said connectivity manager, said accommodation provided in association with accommodated connectivity specification of the given application.

11. A connectivity manager comprising at least one processor and at least one memory and capable of automated managing connectivity between resources in a computer network comprising a plurality of access-control devices controlling connectivity between the network resources in accordance with a plurality of access-control rules, the manager comprising a processor-based connectivity engine operatively coupled to a computer-implemented network interface, wherein the connectivity engine is configured to:

obtain a connectivity specification of a given application, said specification comprising one or more connections generated in accordance with resources and connections therebetween specified by a user with respect to the given application, each connection characterized by one or more source resources, one or more destination resources and services therebetween;

recognize, using the network interface, all access-control devices, among the plurality of access-control devices, involved in controlling all connections comprised in said connectivity specification, wherein at least one access-control device is involved in controlling at least one connection which is not comprised in said generated connectivity specification;

identify in each of the recognized access-control devices, all access-control rules which are engaged in control of connections comprised in said connectivity specification, wherein the plurality of access-control rules comprises at least one rule which is not engaged in control of connections comprised in said connectivity specification; and map said connections comprised in said connectivity specification to the identified engaged access-control rules, wherein the results of said mapping are indicative of changes to be made in the engaged access-control rules in order to provide the connections comprised in the connectivity specification and/or in a client's connectivity request addressed to the given application; and wherein the connectivity engine is further configured to, in response to said mapping, providing at least one of the following:

automatically amend the engaged access-control rules in accordance with said results of said mapping;

issue, by the connectivity manager, one or more tickets related to the access-control devices and specifying said changes;

evaluate, by the connectivity manager, a connectivity status of at least one connection in the given application in accordance with said results of said mapping;

evaluate, by the connectivity manager, a connectivity status of the given application in accordance with said results of said mapping.

12. The connectivity manager of claim 11 wherein the connectivity engine is configured to recognize said access-control devices engaged in control of connections comprised in said connectivity specification responsive to an event selected from a group comprising: generating said connectivity specification; amending a generated connectivity specification of the given application; and receiving a client's connectivity request addressed to the given application.

13. The connectivity manager of claim 11 further comprising a client interface configured to receive a user's definition of connections, wherein said connectivity engine is configured to generate the connectivity specification of the given application in accordance with a received user's definition.

14. The connectivity manager of claim 11 further comprising a client interface configured to receive one or more user's amendments of a connectivity specification, wherein said connectivity engine is configured to generate the connectivity specification of the given application in accordance with received amendments.

15. The connectivity manager of claim 11 wherein the connectivity engine is further configured to monitor changes related to access-control devices and/or changes related to access-control rules implemented on the access-control devices and to further identify the engaged rules responsive to respective changes.

16. The connectivity manager of claim 11 is further configured to monitor the connectivity status of the given application, recognize the status changes, and issue a respective alert.

17. The connectivity manager of claim 11 is further configured to evaluate the client's connectivity request addressed to the given application in accordance with said results of said mapping.

18. The connectivity manager of claim 11 wherein the connectivity engine is further configured to present the recognized access-control devices and/or the identified engaged access-control rules for connections specified in the application.

19. The connectivity manager of claim 11 wherein said connectivity specification of the given application is accommodated in a memory of said connectivity manager.

20. The connectivity manager of claim 19 wherein the results of said mapping are accommodated in the memory of said connectivity manager, said accommodation provided in association with accommodated connectivity specification of the given application.

21. The connectivity manager of claim 19 wherein the recognized access-control devices and/or the identified engaged access-control rules for each connection comprised in the connectivity specification are accommodated in the memory of said connectivity manager, said accommodation provided in association with accommodated connectivity specification of the given application.

22. The connectivity manager of claim 11 implemented as a stand-alone suitably programmed computer operatively connected to said plurality of access-control devices.

* * * * *